United States Patent [19]

Boehringer et al.

[11] 4,424,716
[45] Jan. 10, 1984

[54] HYDRAULIC FLOWMETER

[75] Inventors: Wilfred E. Boehringer, Fullerton; James V. Walker, Redondo Beach, both of Calif.

[73] Assignee: McDonnell Douglas Corp., Long Beach, Calif.

[21] Appl. No.: 273,599

[22] Filed: Jun. 15, 1981

[51] Int. Cl.³ .............................................. G01F 1/24
[52] U.S. Cl. ............................. 73/861.56; 73/DIG. 5
[58] Field of Search ........... 73/861.56, 861.55, 861.57, 73/861.53, 861.58, 861.71, 861.54, DIG. 5; 116/267

[56] References Cited

U.S. PATENT DOCUMENTS

| | | | |
|---|---|---|---|
| 1,696,132 | 12/1928 | Wermeille | 116/267 |
| 2,574,866 | 11/1951 | Fahrlander | 73/861.58 |
| 2,948,151 | 8/1960 | Astl | 116/267 X |
| 3,125,062 | 3/1964 | Raupp et al. | 116/267 X |
| 3,626,756 | 12/1971 | Marshall et al. | 73/861.71 X |
| 3,738,116 | 6/1973 | Gazda | 116/267 X |
| 3,805,611 | 4/1974 | Hedland | 73/861.58 |
| 3,881,354 | 5/1975 | Block | 73/861.71 |
| 3,910,112 | 10/1975 | Gerlach | 73/861.53 |
| 3,974,795 | 8/1976 | Crisp, Jr. | 116/267 |
| 3,980,040 | 9/1976 | Read | 116/267 |
| 4,014,284 | 3/1977 | Read | 116/267 |
| 4,029,042 | 6/1977 | Juhasz | 116/267 |
| 4,130,745 | 12/1978 | Hetzer | 116/267 X |
| 4,368,646 | 1/1983 | Rogg | 73/861.55 |

FOREIGN PATENT DOCUMENTS

| | | | |
|---|---|---|---|
| 161249 | 2/1955 | Australia | 73/861.55 |
| 814944 | 9/1951 | Fed. Rep. of Germany | 73/861.57 |
| 1431867 | 2/1966 | France | 73/861.56 |

Primary Examiner—Gerald Goldberg
Assistant Examiner—John E. Chapman, Jr.
Attorney, Agent, or Firm—Henry M. Bissell; Donald L. Royer; George W. Finch

[57] ABSTRACT

A mechanical flowmeter is provided for measuring the flow of hydraulic fluid in a system in which the flowmeter is connected. The flowmeter contains a spring biased piston which is responsive to the rate of flow through an annular space surrounding the piston as it moves in a tapered bore. A toroidal armature of ferrous (magnetic) material is mounted on a rod extending from the piston for movement therewith. Movement of the armature and the piston rod within a hollow guide is tracked by a permanent magnet of toroidal shape which is mounted surrounding the guide in sliding relationship. A sight glass surrounding the guide and magnet is calibrated with a scale for converting the position of the magnet to an indication of flow rate. For fluid flow in the reverse direction, the piston is moved out of the tapered bore, thus permitting free flow in the reverse direction with minimal energy loss.

25 Claims, 2 Drawing Figures

HYDRAULIC FLOWMETER

BACKGROUND OF THE INVENTION

1. Field of the Invention

This invention relates to flowmeters and, more particularly, to flowmeters employed in detecting hydraulic system leaks, especially in aircraft.

2. Description of the Prior Art

The degree to which an aircraft (or any) hydraulic system leaks, externally or internally, is a direct indication of its general condition or state of repair. External leakage is very obvious, but the magnitude of internal leakage across lapped clearances, imperfect valve seats, defective seals, and the like is more difficult to determine. There are numerous mechanical, electrical, or electro-mechanical devices which measure internal leakage or flow, but they either fall short of desired performance, or are far more complex and expensive than necessary.

Hedland U.S. Pat. No. 3,805,611 discloses a flowmeter in which the position of an internal piston-like flow-sensitive member is tracked by means of a ferrous (magnetic) ring or armature which slides on an outer housing surface in following a permanent magnet on the inside of the device which is attached to the flow-sensitive member. The material (Alnico-type) from which the magnet is made is inherently very brittle and vulnerable to cracking. Because the magnet is in intimate contact with the system fluid, contamination of the system can readily occur. Such contamination is intolerable in aircraft systems, for example.

A similar structure used as an unloader indicator in a refrigeration system compressor of the screw type is disclosed in U.S. Pat. No. 3,738,116 of Gazda. Wermeille in U.S. Pat. No. 1,696,132 discloses a water meter using a pair of permanent magnets on opposite sides of a diaphragm seal with one of the magnets being driven by a pump and the other following the movement of the first magnet. As in all devices of the so-called "wet" magnet type, fluid flowing through such a device is subject to contamination from the flaking or break-up of the magnet in contact with the fluid.

Various types of differential pressure gages are disclosed in U.S. Pat. Nos. 2,948,151 of Astl, 3,125,062 of Raupp et al, 3,974,795 of Crisp, Jr., 3,980,040 and 4,014,284 of Read, 4,029,042 of Juhasz and 4,130,745 of Hetzer. However, these devices do not appear to be suitable for meaasuring fluid flow rates, as contrasted with indicating differences in two distinct applied pressures.

SUMMARY OF THE INVENTION

In brief, arrangements in accordance with the present invention provide for slidably mounting a permanent magnet on the outside of a hollow guide which is open to the fluid flow passage. Thus, the permanent magnet in this device is of the dry type which cannot contaminate the fluid system. Moreover, because of the position of the magnet in this relationship, it can be replaced quite readily in the event of fracture.

The flowmeter includes a housing having an L-shaped flow passage, the major portion of which is through a tapered bore, or piston travel passage which increases in diameter toward the outlet end of the device. A piston is mounted for axial movement along the tapered bore in response to fluid flow in the forward or "measured flow" direction. The hollow guide on which the permanent magnet slides extends outwardly of the housing in line with the tapered bore axis and encircles a rod extending from the piston. A toroidal armature of magnetic material is mounted on the rod for axial movement therewith. A first biasing spring is mounted to urge the assembly comprising the piston, rod and armature toward a zero, or minimum flow, position. As flow rate through the fluid flow passage including the tapered bore increases, a differential pressure across the piston is developed as fluid flows through a small annular space between the piston and the bore. This causes the piston to move along the bore in the direction of increasing diameter, with that motion being resisted by the biasing spring. As the armature moves with the piston and rod, a ring magnet riding on the outside of the guide remains magnetically coupled with the armature and maintains its alignment therewith as the latter moves to a point where the differential pressure produced by fluid flow across the annular space surrounding the piston develops sufficient force to balance the force output of the biasing spring. At such point, the position of the piston, rod and armature assembly is maintained, as is also the position of the tracking magnet. A flow rate scale is provided on a sight glass extending along the path of the permanent magnet, calibrated to relate the particular piston position with a unique flow rate corresponding thereto.

The piston is biased against movement in the opposite direction from its rest position near the smaller end of the tapered bore by a second biasing spring. This permits the piston to move in the reverse direction, entirely out of the tapered bore portion of the fluid passage, upon the occurrence of fluid flow in the opposite, or "free flow" direction. Movement of the piston out of the bore under the influence of reverse direction flow produces a rapid increase in the area of the opening presented to fluid flow, thus resulting in minimal energy loss for the reverse flow condition.

The magnetic member or armature is installed in a semi-dead chamber, offset from the fluid flow passage of the device, such that ferrous particles in the fluid are not being continually trapped as fluid passes through the unit. Arrangements in accordance with the invention are suitable for determining fluid flow rate in any hydraulic system. Adaptation of the device to different systems merely requires matching the flow rate scale calibration to the specific gravity of the fluid with which it is to be used.

The flowmeter of the invention is totally mechanical, except for the intercoupled permanent magnets, thereby eliminating many potential problems and complexities which can be associated with electrical devices. It provides accuracy comparable to that of much more expensive devices. With the magnet positioned outside the fluid chamber, loose fragments from it can no longer contaminate the system fluid in the event the magnet becomes cracked. Replacement of the magnet is also a relatively simple matter without even having to remove the meter from the system.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
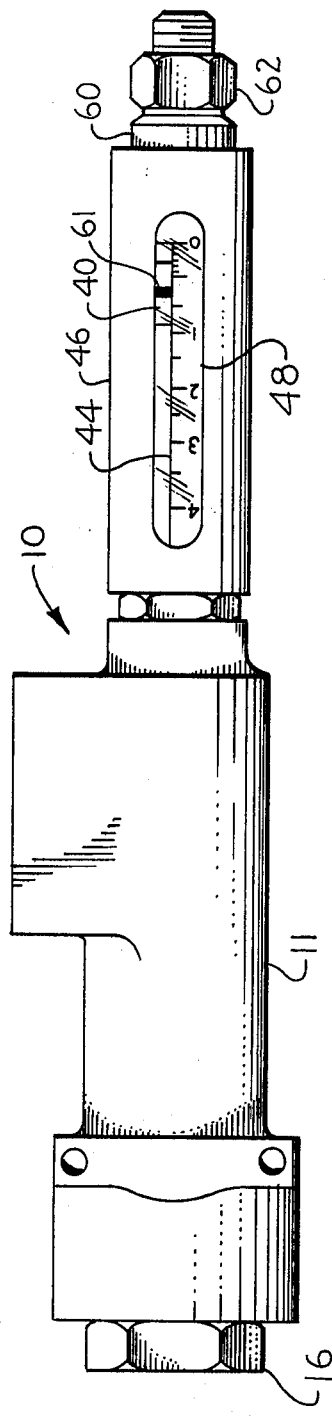
FIG. 1 is a side elevation of one particular arrangement in accordance with the invention.
Figure 2:
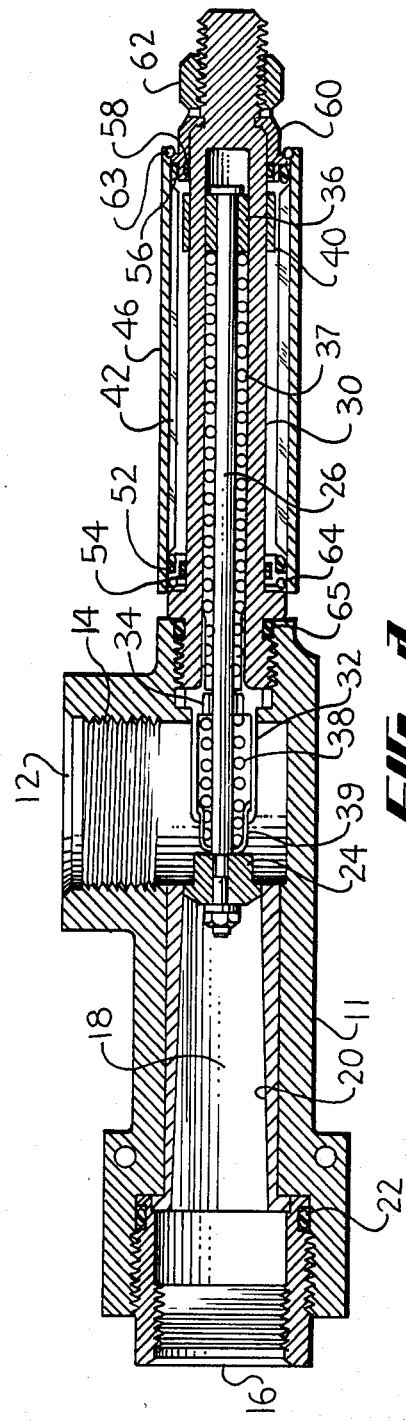
FIG. 2 is a longitudinal planar cross-sectional view of the arrangement of FIG. 1.

As shown in FIGS. 1 and 2, the flowmeter 10 has a housing 11 which is provided with an inlet port 12, an inlet chamber 14, an outlet port 16, and an orifice tube 18 connecting outlet port 16 with inlet port 12 through inlet chamber 14. The orifice tube 18 is provided with a tapered surface 20, which is inwardly tapered from the outlet port in the direction of the inlet port. An O-ring 22 seals the outlet port to the housing. A piston 24 having an elongated rod 26 fixedly mounted thereto at its proximal end is axially slidably mounted in the orifice tube between the ports.

The housing 11 has attached thereto a closed, axially extended guide portion 30, sealed by O-ring 65 and encasing the distal end of the piston rod 26. An armature 36 of magnetic material is attached to the distal end of the rod 26 and is axially movable in the hollow guide 30. A rod guide member 32 having a ported guide wall 34 is mounted at the juncture of the guide 30 and the housing 11 and extends into the inlet chamber 14.

A first spring 37 is mounted between the armature 36 and the guide wall or stop member 34. The spring 37 biases the piston 24 away from the outlet port 16. A second spring 38, mounted within an extension of the rod guide member 32 and a spring retainer 39, serves to bias the piston 24 against movement into the inlet chamber 14. Together, the springs 37, 38 establish a zero reference position of the piston 24 while permitting movement in either direction under appropriate flow conditions. A ring magnet 40 is disposed externally of, and concentric with, the guide portion 30 and moves axially in response to movement of the armature 36 within the guide 30.

A cylindrical sight glass 42 surrounds the ring magnet 40 and has a calibration scale 44 affixed therein to develop a reading of flow rate. A slotted sleeve 46 is provided for protecting the sight glass and has at least one slot opening 48 for viewing the calibration scale 44. The sight glass is retained in position by snap rings 63 and 64.

The device 10 functions to measure flow rate in the following manner: with fluid flowing in the "measured flow" direction from inlet 12 to outlet 16, a differential pressure is created across the piston 24 as fluid flows through the annular opening between the piston head outside diameter and the tapered surface 20 of the orifice tube 18. The piston 24 is moved to the left in FIG. 2 by the force created by the aforementioned differential pressure, with that motion being resisted by the spring 37 acting on the armature 36. The ring magnet 40 with index line 61 riding on the outside diameter of guide 30 remains magnetically coupled with the armature 36 and maintains its alignment with the armature as the latter moves. When the piston reaches a particular position where the differential pressure produced by the fluid flow through the annular opening presented to it creates sufficient force to balance the force output of the first spring 37, that position is maintained, as is also the position of the tracking magnet 40. The calibration scale 44 affixed to the inside surface of sight glass 42 is used to relate that particular piston position to a unique flow rate corresponding thereto. The reading is made by correlating index 61 with scale 44 through a slotted opening in the sleeve 46 protecting the sight glass.

The annular cavity in which the magnet moves is sealed by O-rings 52, 54, 56, 58 at opposite ends to prevent entry of any foreign material which could interfere with the sliding freedom of the magnet 40 or cause deterioration of the flow rate scale cemented to the inside surface of the sight glass 42. The distal end of the cavity is closed by a support member 60, retained by nut 62.

Flow in the opposite or "free flow" direction (from outlet port 16 to inlet port 12) develops a force driving the piston 24 to the right against the relatively light force of the spring 38. This movement to the right causes the piston to be withdrawn from the close fitting bore of the tapered orifice tube 18, producing a rapid increase in the area of the opening presented to fluid flow. The result is free flow with minimal energy loss for the reverse flow condition.

Replacement of the ring magnet 40 is a comparatively simple matter which involves removing the nut 62, snap ring 63 and support member 60 from the guide 30, after which the sleeve 46, sight glass 42 and magnet 40 can be removed. Because of the accessible mounting of the ring magnet outside the sealed fluid chambers, the ring magnet cannot contaminate the hydraulic fluid and the flowmeter does not have to be removed from the hydraulic system or in any way shut down in order to facilitate such maintenance. Further, since the armature 36 is installed in what may be termed a "semi-dead" chamber (within the hollow guide 30), any ferrous particles in the hydraulic fluid will not be continually trapped as flow passes through the housing 11. Accordingly, no impediment to fluid flow is provided by the flowmeter of the invention.

Although there have been described above specific arrangements of a hydraulic flowmeter in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A flowmeter for measuring fluid flow in a forward flow direction within at least a portion of a fluid system comprising:
   a housing having inlet and outlet ports for connection to fluid passages of the system, the ports being axially oriented in different directions;
   a piston travel passage connected in series for fluid flow between the inlet and outlet ports;
   a piston mounted within said passage for travel longitudinally thereof;
   means for developing movement of the piston within said passage in accordance with fluid flow therethrough;
   a guide chamber extending from the housing and encasing a rod connected to the piston, the guide chamber and rod each having respective proximal ends adjacent the housing and distal ends remote therefrom;
   an armature of magnetic material mounted on the rod for travel with the rod and piston;
   a magnet positioned outside the guide chamber and slidable therealong in alignment with the armature for indicating movement of the piston in the measured flow direction;

balancing means for urging the piston to a zero reference position in the absence of flow through the flowmeter in either direction; and an enlarged fluid region adjacent the zero reference position of the piston at one end of the piston travel passage, the piston being movable into said enlarged fluid region upon fluid flow through the flowmeter in a reverse flow direction opposite to forward flow, thereby eliminating restriction to fluid flow by the piston and permitting reverse fluid flow substantially unimpeded.

2. The flowmeter of claim 1 further including a scale positioned to measure movement of the magnet and calibrated to indicate a measured rate of flow of fluid through the flowmeter in a forward flow direction.

3. The flowmeter of claim 2 wherein the scale is calibrated as a function of the specific gravity of the fluid to be measured.

4. The flowmeter of claim 1 wherein the enlarged fluid region comprises an inlet chamber between the inlet port and the piston travel passage and extending at generally right angles to the axis of said passage.

5. The flowmeter of claim 4 wherein the guide chamber is coupled to the housing adjacent the inlet chamber and is sealed throughout its extent and at the distal end thereof except for at least one opening at the proximal end thereof communicating with the inlet chamber.

6. The flowmeter of claim 5 further including a guide member positioned adjacent the proximal end of the guide chamber for guiding the piston rod in its travel.

7. The flowmeter of claim 1 wherein the guide chamber is generally cylindrical in at least the portion encasing the piston rod.

8. The flowmeter of claim 7 further including a generally cylindrical sight glass surrounding at least a portion of the guide chamber.

9. The flowmeter of claim 8 further including a selectively calibrated scale mounted to the inside surface of the sight glass in a manner so as to be visible from the outside of the sight glass.

10. The flowmeter of claim 9 further including a generally cylindrical sleeve extending around the sight glass and coextensive therewith, said sleeve having at least one slot opening along a portion in registration with the scale in order to permit viewing of the scale through said opening.

11. The flowmeter of claim 10 further including sealing means to seal the spaces between the sight glass and the outside of the guide chamber at the ends of the sight glass to prevent contamination of the space between the sight glass and the guide chamber.

12. The flowmeter of claim 11 further including a support member mounted on the distal end of the guide chamber for maintaining the sight glass and the sealing means in sealing contact.

13. The flowmeter of claim 12 wherein the support member is removable to permit removal of the sleeve and the sight glass and permit access to, and removal of, the magnet for replacement.

14. The flowmeter of claim 1 wherein the magnet is a ring magnet surrounding the cylindrical guide chamber in a position generally coextensive with the armature.

15. The flowmeter of claim 14 wherein the armature is a ring-shaped member surrounding the piston rod at the distal end thereof.

16. The flowmeter of claim 1 wherein the balancing means includes means for restoring the piston to the zero reference position upon the cessation of fluid flow in the reverse flow direction.

17. The flowmeter of claim 1 wherein the balancing means includes a first compression spring biasing the piston and rod against movement in the direction of measured flow.

18. The flowmeter of claim 17 wherein the balancing means comprises a second compression spring biasing the piston and rod against movement from the zero reference position in a reverse flow direction.

19. The flowmeter of claim 18 wherein the balancing means includes a rod guide member having a stop member, and wherein the first compression spring surrounds the rod and extends between the stop member and the armature.

20. The flowmeter of claim 19 wherein the second compression spring encircles the rod and extends between the proximal end of the rod and the stop member.

21. The flowmeter of claim 20 further including a retainer for the second compression spring mounted adjacent the piston and movavble with the piston and rod relative to the stop member and rod guide.

22. The flowmeter of claim 18 wherein the first and second compression springs are generally in line with each other along different portions of the rod.

23. The flowmeter of claim 1 wherein the means for developing movement of the piston within said passage comprises a tapered cylindrical bore axially aligned with the piston.

24. The flowmeter of claim 23 wherein the tapered bore provides an annular space surrounding the piston for flow of fluid therethrough in the forward direction, said annular space increasing in cross-sectional area with travel of the piston in the measured flow direction within the piston travel passage.

25. The flowmeter of claim 24 wherein said balancing means further including means for developing a force variable with movement of the piston along the piston travel passage for balancing at different positions of the piston the forces developed at those positions by fluid flow through the annular space between the piston and the adjacent section of the tapered bore.

* * * * *

UNITED STATES PATENT OFFICE
CERTIFICATE OF CORRECTION

PATENT NO. : 4,424,716
DATED : 10 January 1984
INVENTOR(S) : Wilfred E. Boehringer, et al.

It is certified that error appears in the above-identified patent and that said Letters Patent are hereby corrected as shown below:

In column 1, line 49, the word [meaasuring] should be measuring.

In column 2, line 51, the word [magnets] should be magnet.

Signed and Sealed this

Fifth Day of March 1985

[SEAL]

Attest:

DONALD J. QUIGG

Attesting Officer     Acting Commissioner of Patents and Trademarks